US006608958B2

(12) United States Patent
Anderson

(10) Patent No.: US 6,608,958 B2
(45) Date of Patent: Aug. 19, 2003

(54) CENTRALIZING CLAMP FOR AN OPTICAL FIBER

(75) Inventor: Bretton E. Anderson, Atkinson, NH (US)

(73) Assignee: Ksaria Corporation, Wilmington, DE (US)

( * ) Notice: Subject to any disclaimer, the term of this patent is extended or adjusted under 35 U.S.C. 154(b) by 0 days.

(21) Appl. No.: 09/900,486

(22) Filed: Jul. 6, 2001

(65) Prior Publication Data

US 2003/0007769 A1 Jan. 9, 2003

(51) Int. Cl.[7] .................................................. G02B 6/00
(52) U.S. Cl. ....................................... 385/136; 385/134
(58) Field of Search ................................. 385/134, 136, 385/137, 140, 37, 48, 32, 95–99

(56) References Cited

U.S. PATENT DOCUMENTS

| | | |
|---|---|---|
| 3,456,324 A | 7/1969 | Hahn et al. |
| 3,686,752 A | 8/1972 | Hammond |
| 3,703,954 A | 11/1972 | Gudmestad |
| 3,768,143 A | 10/1973 | Holmes, Jr. |
| 3,909,900 A | 10/1975 | Gudmestad |
| 4,175,316 A | 11/1979 | Gudmestad |
| 4,276,113 A * | 6/1981 | Carlsen et al. ............... 156/158 |
| 4,336,047 A | 6/1982 | Pavlopoulos et al. |
| 4,763,272 A | 8/1988 | McLandrich |
| 4,916,811 A | 4/1990 | Uehara et al. |
| 5,208,977 A | 5/1993 | Ricard |
| 5,386,490 A | 1/1995 | Pan et al. |
| 5,395,101 A * | 3/1995 | Takimoto et al. ............. 269/25 |
| 5,770,001 A | 6/1998 | Nagayama et al. |
| 5,926,594 A | 7/1999 | Song et al. |
| 5,970,749 A * | 10/1999 | Bloom ........................ 65/378 |
| 6,003,341 A | 12/1999 | Bloom |
| 6,122,936 A | 9/2000 | Csipkes et al. |
| 6,237,370 B1 | 5/2001 | Bloom |

FOREIGN PATENT DOCUMENTS

JP         2000123661 A  *  4/2000  ......... H01B/13/012

* cited by examiner

Primary Examiner—John D. Lee
Assistant Examiner—Daniel Valencia
(74) Attorney, Agent, or Firm—Wolf, Greenfield & Sacks, P.C.

(57) ABSTRACT

A centralizing clamp for positioning each of a plurality of fibers along a predefined clamping axis, each fiber having an outer diameter that differs from an outer diameter of others of the plurality of fibers. The centralizing clamp comprises first and second clamp jaws movably supported, relative to the predefined clamping axis, between an open position and a closed position to hold any one of the fibers therebetween. The clamp jaws may be configured to capture a fiber initially located within a region of uncertainty about the clamping axis that has a diameter that is greater than the outer diameter of the fiber. The clamp may also include an actuator coupled to the clamp jaws to actuate the clamp jaws between the open and closed positions in response to an actuation signal. One or more sensors may be provided to detect a presence of the fiber between the closed clamp jaws, and/or to detect the state of the clamp in the open or closed positions. A fluid seal may be provided on the clamp to seal and hold a fiber in position on a cleaning tank during a fiber cleaning process.

41 Claims, 7 Drawing Sheets

CENTRALIZING CLAMP FOR AN OPTICAL FIBER

BACKGROUND OF THE INVENTION

1. Field of the Invention

The present invention relates to a clamping device, and more particularly a centralizing clamp for an optical fiber.

2. Description of Related Art

Optical devices are becoming increasingly popular, particularly for use in networking applications. In an optical network or other circuit, optical devices are interconnected via optical fiber, which serves as the transmission medium for transmitting information between the devices. Similarly, an optical device is often made up of multiple optical components that are interconnected, internally within the device, via optical fibers.

The conventional techniques for interconnecting multiple optical components within a device is through the use of a pigtail. A pigtail is essentially a length of optical fiber that includes some type of plug or ferrule attached to at least one end of the fiber. The ferrule provides some structural support to the optical fiber making it easier to handle and to connect directly with optical components or other optical fibers. A pigtail is typically pre-assembled and provided ready to be connected to an optical component. An optical device may utilize one or more pigtails to optically interconnect any number of optical components.

A pigtail is typically assembled by first cutting a desired length of optical fiber from a spool, and winding the fiber into a more compact configuration to facilitate its handling. The coiled fiber may be subject to various manufacturing steps, such as stripping the protective covering off at least one end of the fiber, cleaning the end of the fiber, cleaving the end of the fiber to obtain a high quality optical surface, and attaching a ferrule to the end of the fiber. During the process, the fiber may be clamped or otherwise restrained to maintain the ends of the fiber in a desired position during one or more manufacturing steps.

It is an object of the present invention to provide a centralizing clamp for a fiber, such as an optical fiber.

SUMMARY OF THE INVENTION

In one illustrative embodiment of the invention, a centralizing clamp is provided for positioning each of a plurality of fibers along a predefined clamping axis, each of the plurality of fibers having an outer diameter that differs from an outer diameter of others of the plurality of fibers. The centralizing clamp comprises a base and first and second clamp jaws movably supported by the base, relative to the predefined clamping axis, between an open position and a closed position to hold any one of the plurality of fibers therebetween. The first and second clamp jaws are constructed and arranged to position each one of the plurality of fibers coaxial with the predefined clamping axis when moved toward the closed position. Each of the first and second clamp jaws includes at least first and second clamping surfaces, the first clamping surface being angled with respect to the second clamping surface.

In another illustrative embodiment of the invention, a centralizing clamp is provided for positioning a length of fiber along a predefined clamping axis, the fiber having a fiber axis and an outer diameter. The centralizing clamp comprises a base and first and second clamp jaws movably supported by the base relative to the predefined clamping axis between an open position and a closed position to hold the fiber therebetween. The jaws are constructed and arranged to capture the fiber with the fiber axis initially located within a region of uncertainty about the clamping axis and position the fiber coaxial with the clamping axis as the first and second jaws are moved toward the closed position. The region of uncertainty has a diameter that is greater than the outer diameter of the fiber.

In a further illustrative embodiment of the invention, a centralizing clamp is provided for positioning a length of fiber along a predefined clamping axis. The centralizing clamp comprises a base and first and second pairs of opposing clamp surfaces movably supported by the base between open and closed positions relative to the predefined clamping axis. The first and second pairs of opposing clamp surfaces are movable toward first and second planes, respectively, as the first and second pairs of opposing clamp surfaces move toward the closed position to form a fiber receptacle that is configured to position the fiber coaxial with the predefined clamping axis. The first plane intersects the second plane along the clamping axis. At least one of the first and second pairs of opposing clamp surfaces is engageable along one of the first and second planes, respectively, in the closed position.

In yet a further illustrative embodiment of the invention, a centralizing clamp is provided for positioning a length of fiber along a predefined clamping axis. The centralizing clamp comprises a base and first and second clamp jaws movably supported by the base relative to the predefined clamping axis between an open position and a closed position. The first and second jaws are constructed and arranged to form a fiber receptacle when moved toward the closed position. The fiber receptacle is configured to position the fiber coaxial with the predefined clamping axis. The clamp further comprises a sensor, supported adjacent at least one of the first and second clamp jaws, that is adapted to detect a presence of the fiber within the fiber receptacle.

In still another illustrative embodiment of the invention, a centralizing clamp is provided for positioning a length of fiber, having an outer diameter, along a predefined clamping axis. The centralizing clamp comprises means for capturing the fiber initially located within a region of uncertainty about the clamping axis, the region of uncertainty having a diameter that is greater than the diameter of the fiber, and means for positioning the fiber coaxial with the clamping axis.

BRIEF DESCRIPTION OF THE DRAWINGS

The invention will be appreciated more fully with reference to the following detailed description of illustrative embodiments thereof, when taken in conjunction with the accompanying drawings, wherein like reference characters denote like features, in which.

DETAILED DESCRIPTION

Figure 1:
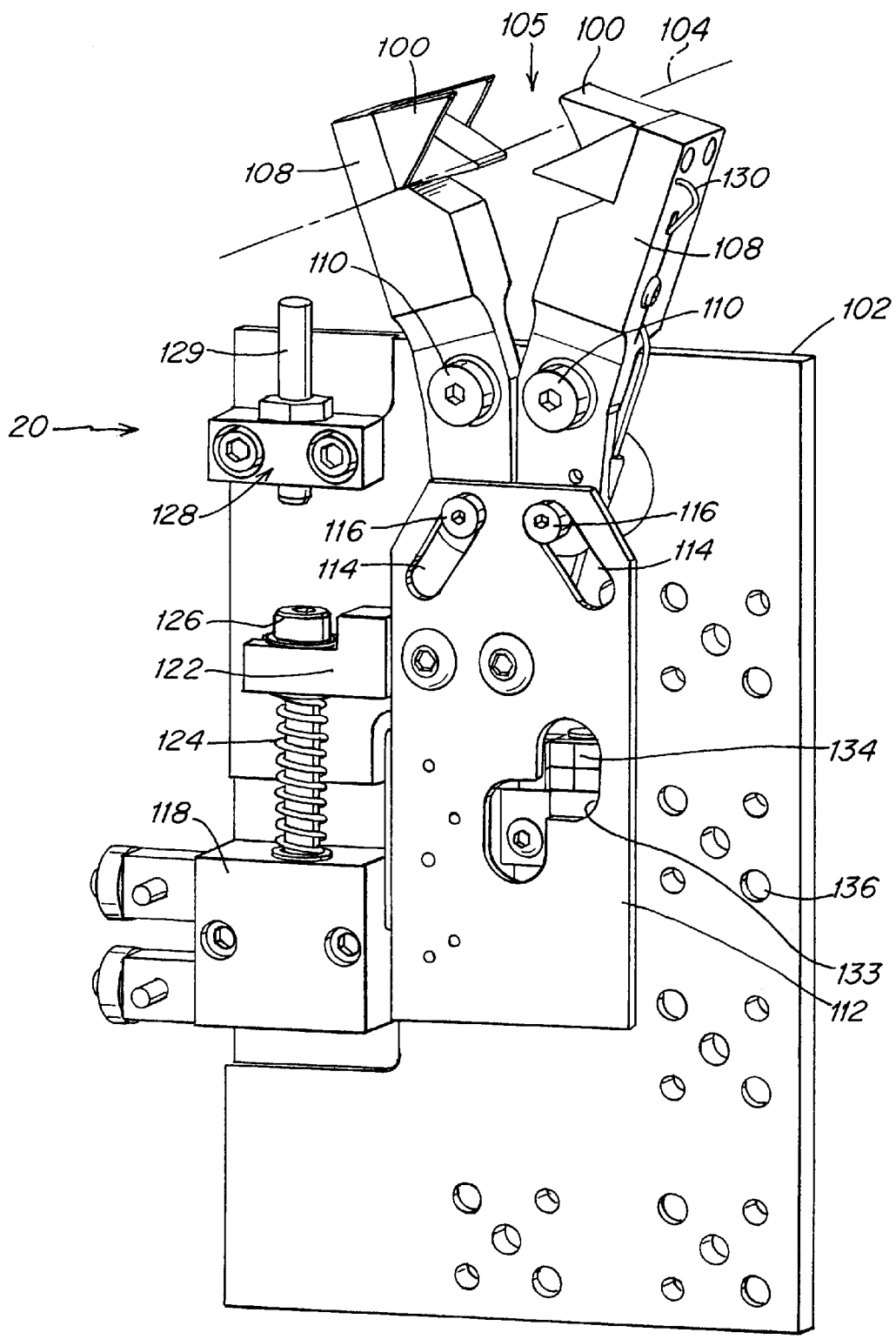
FIG. 1 is a perspective view of a centralizing clamp according to one illustrative embodiment of the invention illustrated in the open position.

The present invention is directed to a centralizing clamp for positioning a length of fiber along a predefined clamping axis. The clamp captures a fiber having any outer diameter within a range of diameters and positions the fiber coaxial with the clamping axis. The clamp also captures and positions the fiber regardless of its location within a region of uncertainty about the clamping axis.

The clamp may be employed to precisely locate a fiber in a desired position to facilitate various manufacturing processes. For example, the clamp may be particularly suited to precisely locate an optical fiber for stripping, cleaning, cleaving and ferrule attachment processes associated with the fabrication of optical fiber pigtails and the like. In this regard, the clamp may be configured for use with optical fibers having an outer diameter from approximately 180 microns to approximately 900 microns. It is to be appreciated, however, that the clamp may be utilized for any application where it is desirable to precisely locate a fiber, wire, cable and other like objects in a desired position.

The clamp includes clamping jaws that are movable between an open position for receiving and releasing the fiber and a closed position for capturing and centralizing the fiber along the clamping axis. The jaws may be configured to form a radial opening in the open position to receive the fiber in a radial direction relative to the clamping axis. The jaws may form a fiber receptacle in the closed position that is adapted to radially position the fiber coaxial with the clamping axis.

The jaws may be configured to apply a desired clamping force in the closed position to grip and retain the fiber, without damaging the fiber, when it is placed under axial tension. In this regard, the jaws may be configured to grip the fiber with minimal, if any, shear force placed on the fiber. Additionally, the clamping force of the jaws may be adjustable.

Each clamp jaw may include at least two clamp surfaces that are configured to cooperate with their respective opposing clamp surfaces to centralize and grip the fiber along the clamping axis. The pair of opposing clamp surfaces move toward a pair of clamping planes that intersect each other along the clamping axis. The intersecting plane configuration of the clamp surfaces facilitates the accurate positioning of the fiber along the clamping axis. The clamp surfaces may be adapted to clamp the fiber using only radial compressive forces and substantially without exerting any shear forces on the fiber.

The clamp may be configured to automatically actuate the jaws between the open and closed positions. One or more sensors may be employed to determine the operational configuration of the jaws and/or to sense the presence of a fiber within the fiber receptacle.

It is to be appreciated that the centralizing clamp of the present invention may include any one or combination of these and other features. The following description of various embodiments of the clamp are not intended to be limiting.

Figure 2:
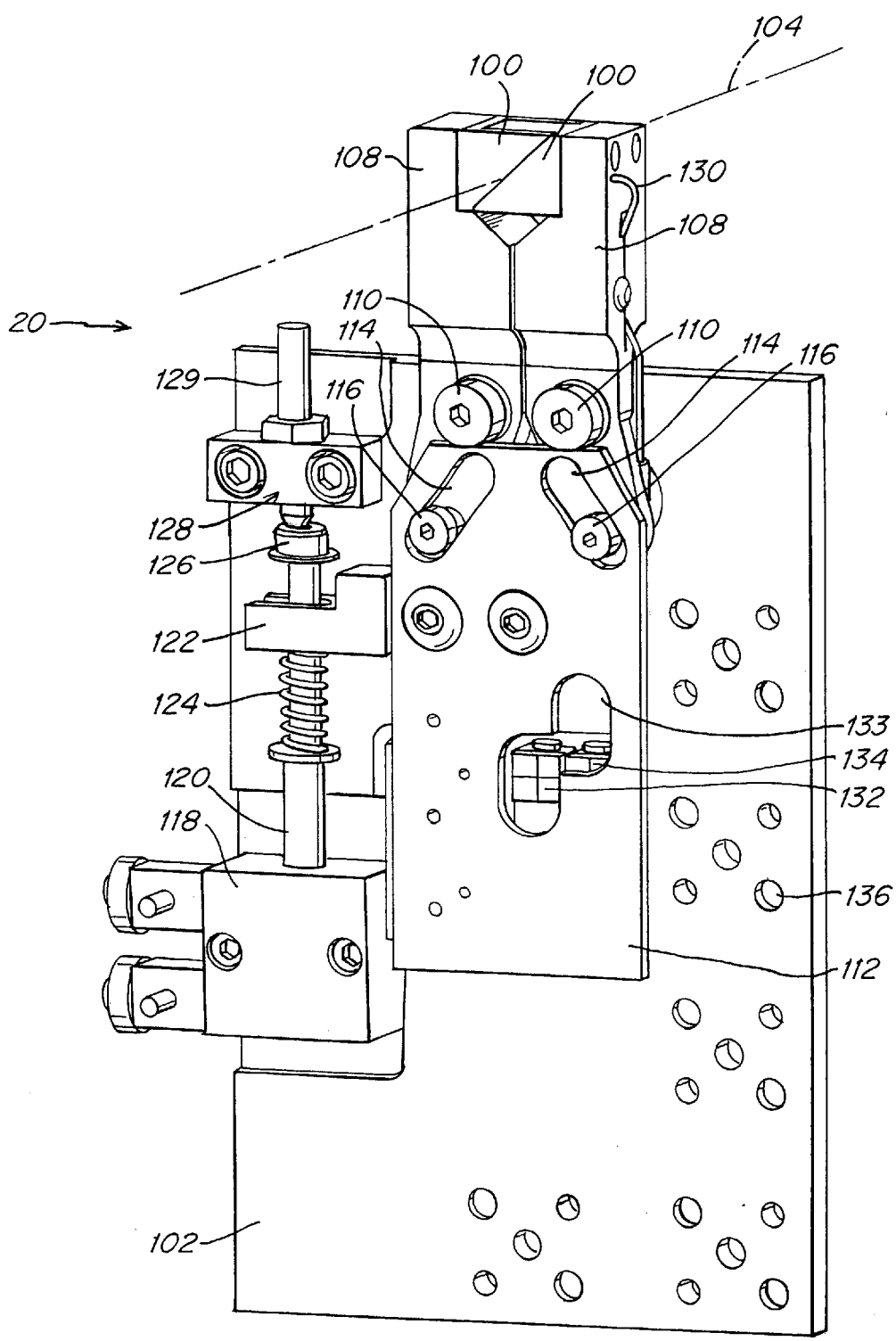
FIG. 2 is a perspective view of the centralizing clamp of FIG. 1 illustrated in the closed position.

In one illustrative embodiment shown in FIGS. 1–2, the centralizing clamp 20 includes a pair of opposed clamping jaws 100 that are moveably supported by a clamp base 102 between an open position (FIG. 1) and a closed position (FIG. 2). The base is configured to support the jaws relative to a predefined clamping axis 104. In the open position, the jaws 100 form a radial opening 105 that is adapted to receive a fiber in a radial direction relative to the clamping axis. In the closed position, the jaws 100 capture the fiber located anywhere within a region of uncertainty between the jaws and position it coaxial with the clamping axis.

Each clamp jaw 100 may include at least two clamp surfaces that are angled relative to each other so that, when the clamp is closed, at least four surfaces cooperate to position the fiber along the clamping axis. In one illustrative embodiment shown in FIG. 3, each clamp jaw 100 includes a central clamp surface 202 and a pair of end clamp surfaces 204 disposed at opposite ends of the jaw. The end clamp surfaces 204 are oriented transverse to the central clamp surface 202 to form a generally V-shaped notch along the length of the jaw. This configuration provides two centralizing zones at opposite ends of the jaws to facilitate accurate positioning of the fiber coaxial with the clamping axis.

It is to be appreciated that other jaw configurations may be employed to center and grip the fiber. In this regard, each clamp jaw may comprise any number of clamping surfaces which may be of the same or different widths. For example, each jaw may include two, as opposed to three, clamp surfaces having the same surface area that are angled relative to each other to form the V-shaped notch. The clamp may also employ any suitable number of jaws including one or more clamp surfaces.

The jaws are configured to nest with each other so that the respective central clamp surfaces 202 and end clamp surfaces 204 are positioned opposite each other as the clamp is closed about a fiber with the central clamp surface 202 on one jaw overlapping the end clamp surfaces 204 of the opposing jaw. As illustrated in FIGS. 4–7, the opposing V-notch arrangement acts to surround a fiber 300 located in the region of uncertainty 302 and collect the fiber in a fiber receptacle 304 that is formed by the notches coaxial with the clamping axis 104. As the position of the jaws 100 changes relative to each other, the size of the fiber receptacle 304 varies (FIGS. 6–7) about the clamping axis 104 so that the jaws may position fibers of varying diameters coaxial with the clamping axis.

The clamp surfaces of each jaw are angled relative to each other to establish intersecting planes 402, 404 (FIG. 5) between the jaws as they are placed in the closed position. Since a pair of opposing surfaces maintain a fiber parallel to a plane defined by the surfaces, employing a jaw configuration including two pairs of opposing surfaces maintains a fiber parallel to two intersecting planes which facilitate the positioning of the fiber coaxial with the clamping axis. In one illustrative embodiment, the central clamp surface 202 is oriented perpendicular to the end clamp surfaces 204. However, it is to be appreciated that the clamp surfaces may be oriented at any desired angle relative to each other provided that the angle formed between the clamp surfaces is equal for each of the clamp jaws.

The notched jaw configuration, illustrated in FIGS. 3–7, exerts equal and opposite clamping forces on a fiber gripped between the jaws with minimal, if any, shear forces being induced in the fiber. The end clamp surfaces 204 may be recessed slightly from the central clamp surface 202 so that the clamping force exerted on the fiber is uniformly distributed over the length of the central clamp surfaces 202. This arrangement evenly distributes opposing forces over a large area of the fiber and reduces the risk of damaging the fiber, allowing the clamp to exert sufficient force to hold the fiber in position while it is placed under axial tension in processing applications. However, the clamp is not limited in this regard and the end clamp surfaces 204 need not be recessed such that the clamping force may be exerted by each of the clamp surfaces.

Referring again to FIGS. 1–2, in one illustrative embodiment, the jaws 100 are attached to upper ends of a pair of clamp arms 108 rotatably mounted to the base 102 about a pair of arm pivots 110. Lower ends of the clamp arms 108 are coupled to a cam plate 112 that is movably supported by the base. As shown, the upper end of the cam plate may include a pair of angled slots 114 that cooperate with cam followers 116 located on the lower ends of the arms to open and close the clamp jaws 100. In this regard, moving the cam plate 112 in a downward direction away from the jaws drives the cam followers 116 toward each other, which in turn rotates the jaws apart toward the open position (FIG. 1). Conversely, moving the cam plate 112 in an upward direction toward the jaws 100 drives the cam followers 116 apart, which in turn rotates the clamp jaws toward the closed position (FIG. 2). The cam plate 112 is slidably mounted to the base 102 with a rail 115 and carriage 117 arrangement (FIG. 10) disposed between the cam plate and the base.

It is to be understood that any suitable arrangement may be employed to move the clamp jaws 100 between the open and closed positions. For example, the lower ends of the clamp arms 108 may be coupled to independent links that are connected to a common follower. As another example, the clamp arms may be mounted to the base to move toward and away from each other in a linear direction. As a further example, the clamp arms may be rotatably mounted to the base about a common axis. These examples are not intended to be limiting as other arrangements may be implemented as may be apparent to one of skill.

The cam plate 112 may be coupled to an actuator which drives the cam plate in a linear direction along the base. In one illustrative embodiment, the actuator 118 includes an air cylinder with a piston 120 that is extended and retracted in response to the application of air pressure. The piston 120 is coupled to the cam plate 112 with a bracket 122 extending from the side of the plate. It is to be appreciated, however, that any suitable actuation arrangement may be implemented to drive the cam plate relative to the base. For example, a motor and lead screw arrangement may be used to drive the cam plate.

In addition to centralizing a fiber along the clamping axis, it may be desirable to grip the fiber with sufficient force to securely hold it in position, without damaging the fiber, while the fiber is placed under axial tension as may occur during one or more operations on the fiber end. For example, stripping or cleaving the end of an optical fiber may require that the fiber be placed under significant axial tension. The amount of clamping force may vary depending on the particular operation and/or the particular type of fiber being clamped. Thus, the clamp may be configured to control the amount of clamping force applied to a fiber.

In one illustrative embodiment shown in FIGS. 1–2, a compression spring 124 is disposed between the piston 120 and the cam bracket 122. The spring may be held in position using any suitable retainer 126, such as a shoulder screw and the like, that extends through the cam bracket 122 and into the end of the piston 120. Once the piston drives the clamp to its closed position (FIG. 2), further extension of the piston causes the spring 124 to compress against the cam bracket 122 thereby generating a clamping force between the jaws. Of course, other arrangements for generating a desired clamping force may be implemented as may be apparent to one of skill.

It may be desirable to adjust the amount of clamping force for a particular fiber and/or process on the fiber. In the illustrative embodiment, the clamp includes a stop 128 that is aligned with the piston 120 so as to be engaged by the retainer 126 as it is driven upward by the piston. Once the retainer 126 engages the stop 128, further extension of the piston 120 is blocked, thereby limiting the amount of spring compression and, therefore, the clamping force.

To adjust the clamping force in the illustrative embodiment, the stop 128 includes an adjustable pin 129 that may be extended toward and retracted away from the end of the retainer. The stop may be adjustable based on, for example, the diameter of the fiber to be clamped, or a predetermined clamping force for withstanding an axial tension anticipated to be exerted on the fiber. Since the amount of clamping force is a function of the spring constant and the amount of spring compression, one or both of these parameters may be fixed or adjusted to achieve a desired clamping force. It is also to be appreciated that any suitable adjustable force arrangement, if even desired, may be implemented on the clamp.

It may be desirable in some applications to monitor one or more parameters associated with the clamp. In this regard, the clamp may be employed in an automated manufacturing process that would benefit from monitoring a particular parameter of the clamp. For example, it may be desirable to determine if a fiber is present in the jaws before proceeding with an operation requiring the presence of the fiber. As another example, determining if the clamp is open or closed may be desirable before proceeding with certain steps in a process.

Figure 3:
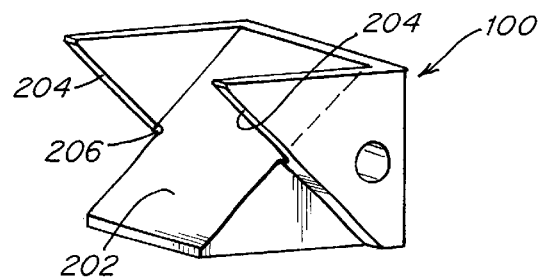
FIG. 3 is a perspective view of one illustrative embodiment of a clamp jaw for the centralizing clamp of FIG. 1.
Figure 4:
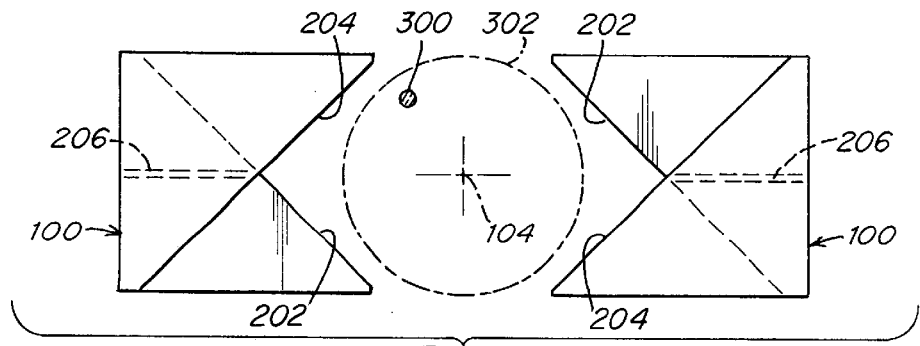
FIGS. 4–5 are schematic views of the clamp jaws of the centralizing clamp of FIG. 1 in the open and closed positions.
Figure 5:
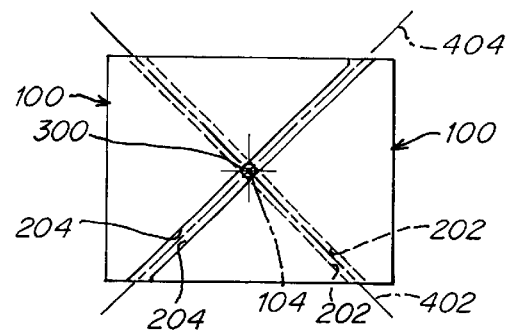
Figure 6:
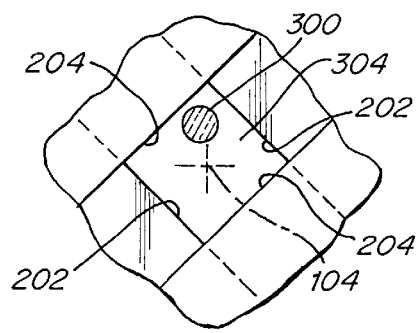
FIGS. 6–7 are enlarged schematic views of the clamp jaws illustrating a fiber receptacle closing about and positioning a fiber.
Figure 7:
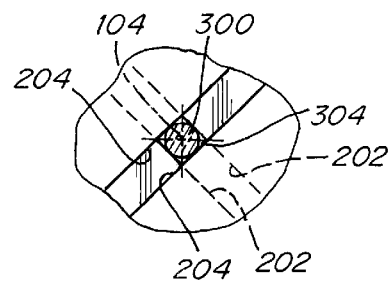

In one illustrative embodiment shown in FIGS. 1–3, the clamp includes a sensor 130 that is adapted to detect the presence of the fiber within the fiber receptacle. The sensor 130 may be supported adjacent at least one of the clamping jaws 100 and positioned to monitor the fiber receptacle 304 (FIG. 6). As shown, the sensor 130 may be positioned at the intersection of the clamp surfaces 202, 204 of the jaw. It is to be appreciated, however, that the sensor, if even desired, may be placed in any location, within or adjacent the clamp jaw, that is suitable for detecting the presence of a fiber when the clamp is in the closed position.

In one embodiment, the sensor 130 is a reflective optical sensor located in a hole 206 (FIGS. 3–4) provided in one of the clamp jaws 100 with a corresponding hole 206 being provided in the opposing jaw. When a fiber is located within the fiber receptacle with the clamp heads closed, at least a portion of the light emitted by the sensor is reflected by the fiber back to the sensor. In response to detection of reflected light, the sensor generates a signal indicating the presence of the fiber. Should there be no fiber present in the receptacle when the jaws are closed, light emitted by the sensor passes through the fiber receptacle and corresponding hole in the opposing clamp jaw so that no light is reflected back to the sensor. In the absence of reflected light, the sensor generates no signal indicative of the presence of a fiber in the fiber receptacle. Although a reflective optical sensor is disclosed, it is to be understood that any suitable sensor may be employed to detect the presence of a fiber in the clamp.

At least one sensor may be provided to determine if the clamp is open or closed. In one illustrative embodiment, the clamp includes a pair of sensors supported by the base. A first sensor 132 is configured to determine if the clamp is open, while a second sensor 134 is configured to determine if the clamp is closed.

In one embodiment, the sensors 132, 134 are inductive proximity sensors that respond to the presence of a metal being located adjacent each sensor. In this regard, the sensors 132, 134 are configured to determine if the clamp is open or closed by monitoring the position of the cam plate relative to each sensor. As shown in FIGS. 1–2, the sensors 132, 134 are mounted to the base plate 102 below the cam plate 112 which has one or more apertures 133 extending therethrough. When the clamp is placed in the open position (FIG. 1), the first sensor 132 is covered by the cam plate 112 while the aperture 133 overlies the second sensor 134 such that the first sensor generates a signal, indicative of the open position of the clamp. Conversely, in the closed position (FIG. 2), the aperture 133 overlies the first sensor 132 while the cam plate 112 covers the second sensor 134 so that the second sensor generates a signal indicative of the closed position of the clamp.

The dual sensor arrangement provides a relatively reliable sensor arrangement, since a positive signal is generated when the clamp is placed in both the open and closed positions. It is to be understood, however, that any number of sensors, including a single sensor, may be utilized in any suitable arrangement to monitor the positioning of the clamp jaws as being open and closed. It is also to be appreciated that the clamp may employ any suitable type of sensor, such as an optical sensor and the like, for monitoring the clamp positions.

Any of the signals, or lack thereof, may be used with a process control system and the like to determine whether or not to continue with one or more process steps, generate a fault indication and the like.

The clamp base 102 may be provided with one or more sets of mounting holes 136 to enable the clamp to be attached to various manufacturing equipment, tools and the like. A plurality of different sets of mounting holes may be provided to accommodate different mounting arrangements on various equipment.

Figure 8:
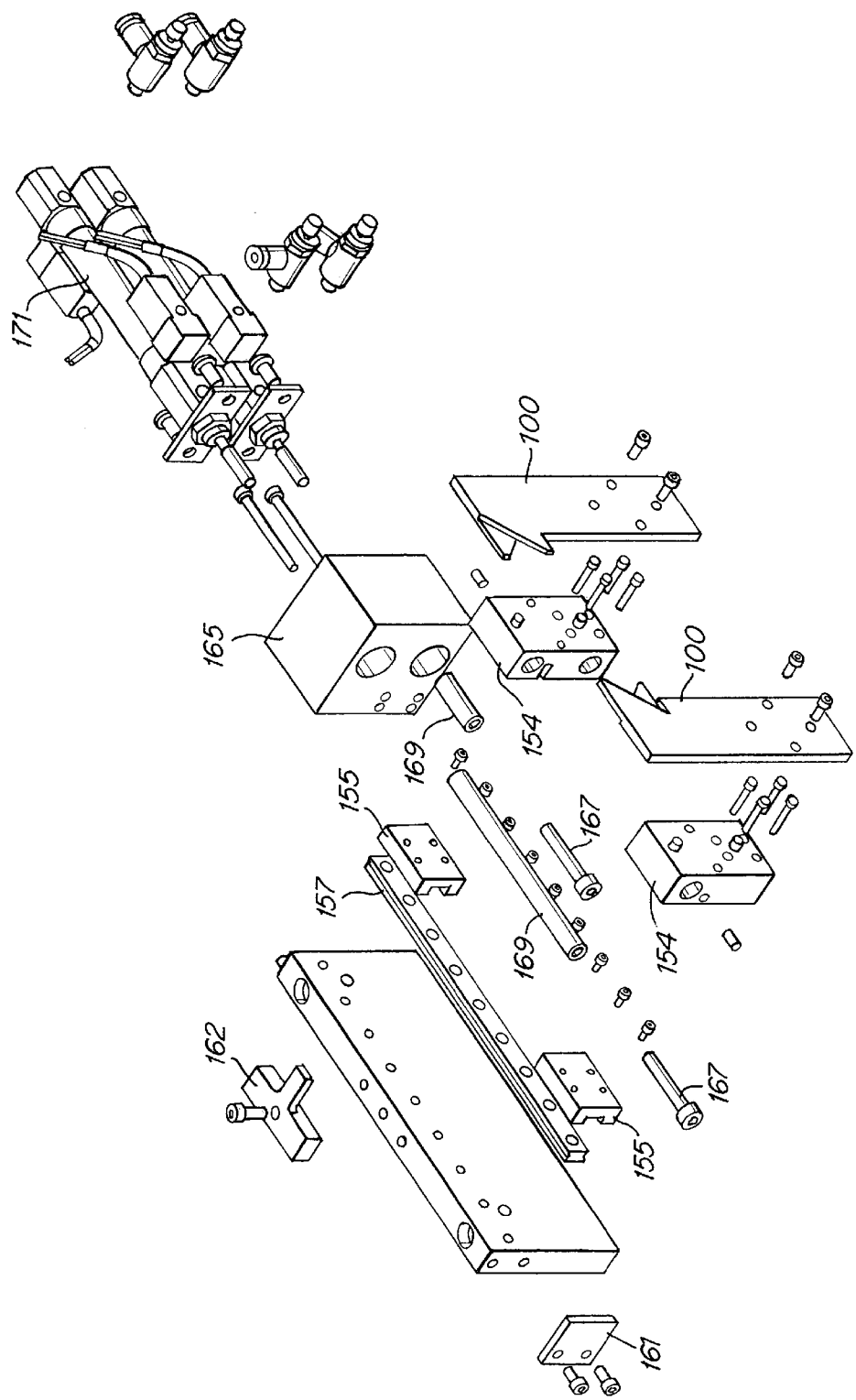
FIG. 8 is an exploded perspective view of a centralizing clamp according to another illustrative embodiment of the invention.

As indicated above, the clamp jaws may employ any suitable arrangement to move the clamp jaws between the open and closed positions. In one illustrative embodiment shown in FIG. 8, the jaws are moved in a linear direction between the open and closed positions. The clamp jaws 100 are mounted to clamp blocks 154 which may slide on carriages 155. The carriages 155 move linearly on a rail 157, but any suitable method of bringing the two jaws 100 together may be used. A stop 161 on one end and a cylinder mount 165 on the other end may provide limits to the outward movement of the clamp jaws 100. A hard stop 162 may be provided to prevent the clamp jaws 100 from closing too far and damaging the fiber. Fasteners 167 may be used to attach the clamp blocks 154 to cylinder couplings 169 that may be driven by pneumatic cylinders 171 in opposite directions. That is, one coupling retracts while the other extends to open and shut the jaws. Any suitable actuator may be used to bring the two jaws 100 together such as, for example, a solenoid or electric motor. A single actuator coupled to both clamp jaws 100 may also be used.

The centralizing clamp may include one or more features for performing various other functions in conjunction with centralizing and gripping a fiber. For example, it may be desirable to clamp the end of a fiber in a desirable position to be cleaned, for example, in a solvent bath. In such an application, it may be desirable to seal the opening through which the fiber extends into the cleaning bath with a seal provided on the clamp.

Figure 9:
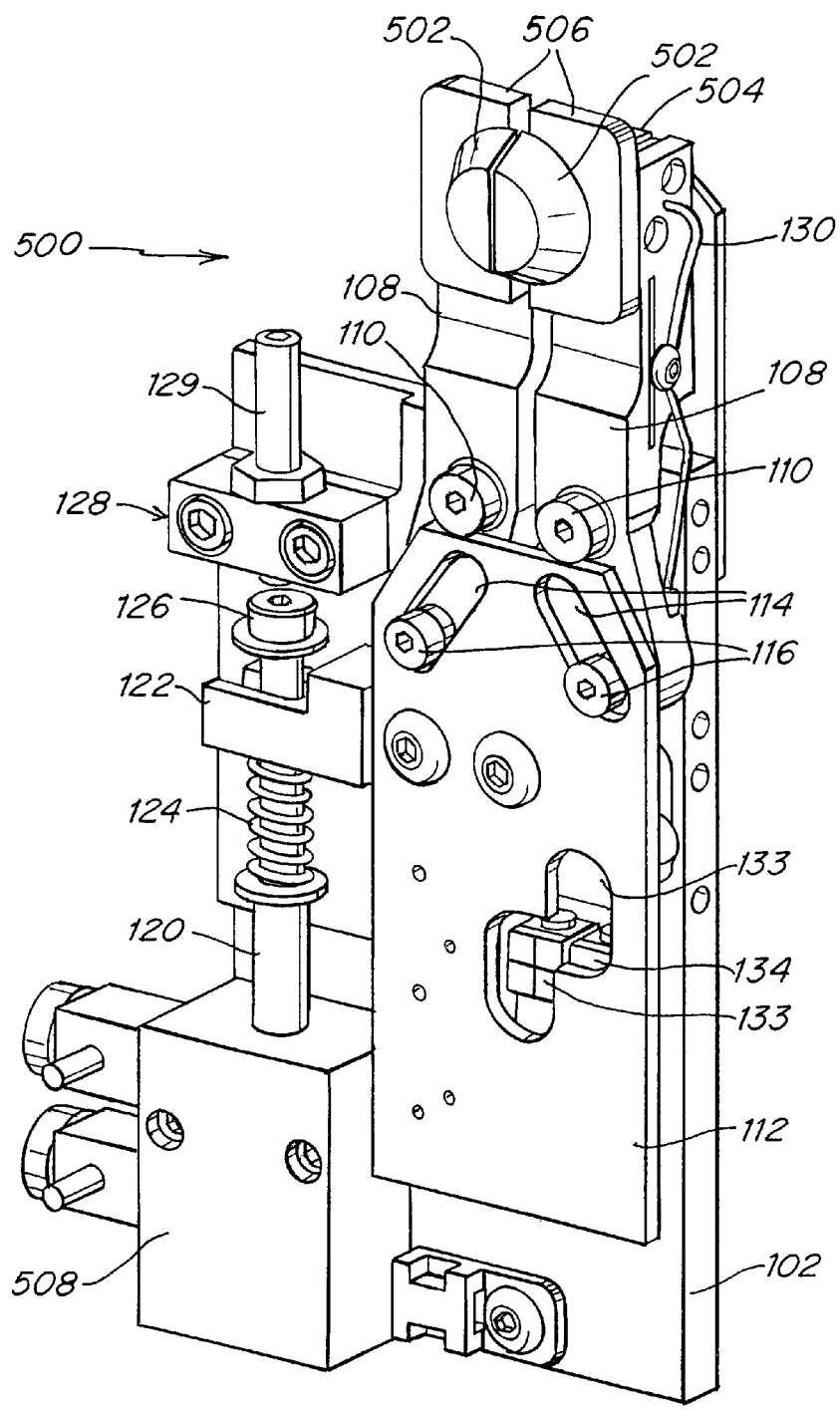
FIG. 9 is a perspective view of a centralizing clamp including a sealing fixture according to a further illustrative embodiment of the invention.
Figure 10:
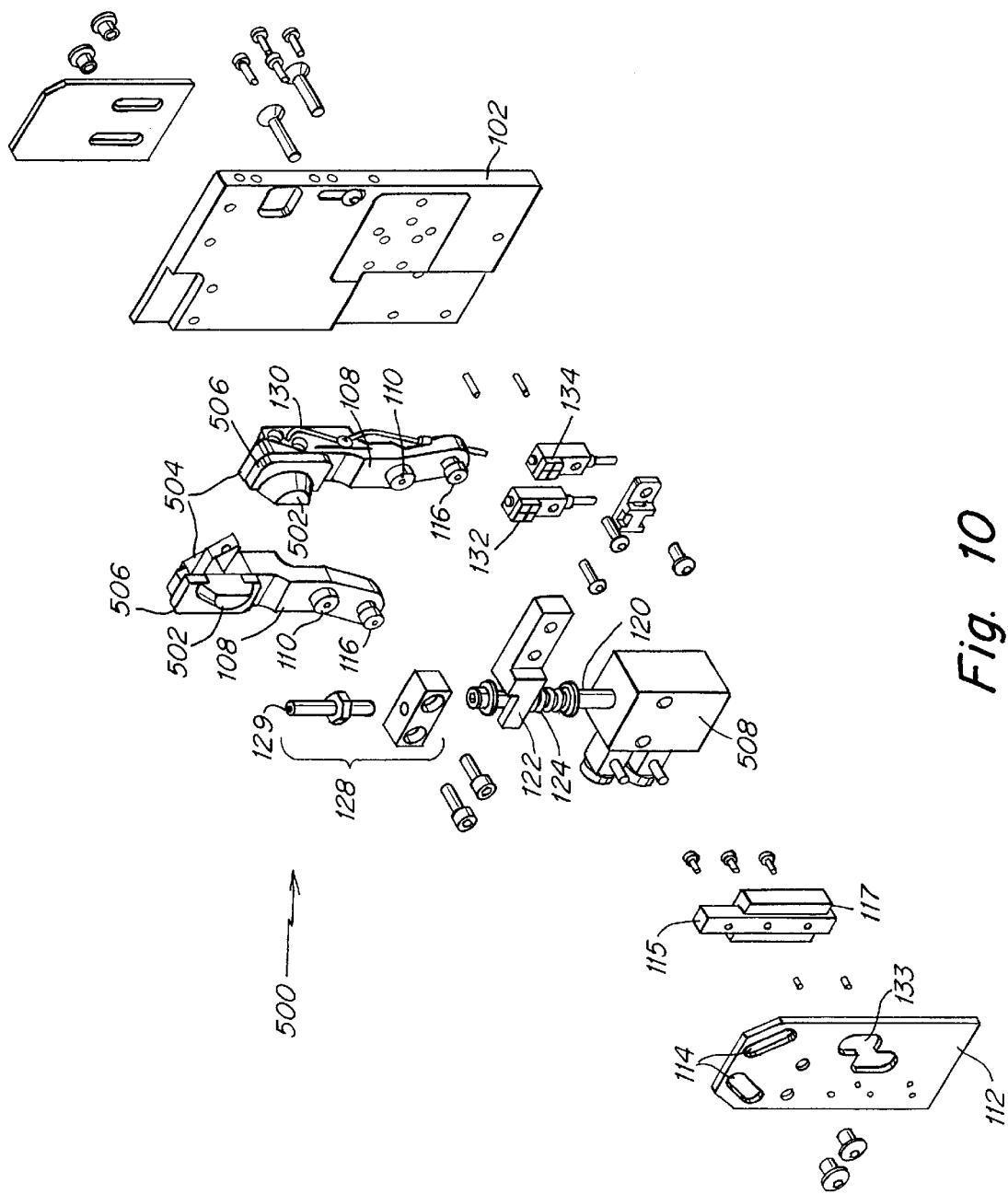
FIG. 10 is an exploded perspective view of the centralizing clamp of FIG. 9.
Figure 11:
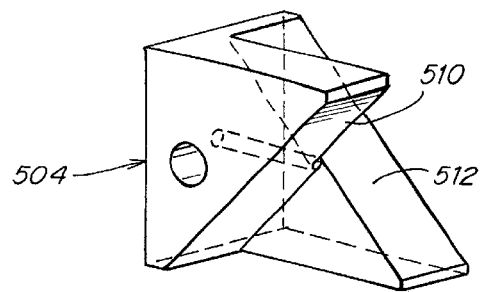
FIG. 11 is a perspective view of another illustrative embodiment of a clamp jaw for the centralizing clamps of FIGS. 1, 8 and 9.

In one illustrative embodiment, shown in FIGS. 9–11, a centralizing clamp 500 includes a seal formed by a pair of opposing seal members 502 supported adjacent a pair of clamp jaws 504. The seal members 502 are configured to be compressed about the fiber in the closed position. The seal members are also configured to form a plug that may be inserted into the fiber entry port of a cleaning tool.

In one embodiment, the plug has a frusto-conical shape that corresponds to the sealing gland on a cleaning tool. The plug is formed from a compliant, abrasion resistant material, such as a polyurethane material having a hardness of 55 Shore A. As is to be appreciated, however, the seal may be formed from any suitable material for preventing leakage of a solvent or other fluid and may have any suitable shape that is compatible with a corresponding sealing surface.

In the illustrative embodiment, each sealing member 502 is mounted to a corresponding clamp arm 108 using a mounting plate 506 that is attached to the arm. The sealing members 502 may be attached to the mounting plates using any suitable fastening arrangement, such as adhesives, screws, rivets and the like.

It may be desirable to maintain a seal with the corresponding sealing surface should there be a disruption of air pressure or other signal to the actuator. In one embodiment, the clamp may employ an actuator 508 configured with a passive, spring extendable cylinder (not shown) within the air cylinder that will maintain the piston 120 in its extended position in the absence of air pressure to the air cylinder. Other arrangements may be implemented to maintain the seals closed, if desired, as may be apparent to one of skill.

The clamp jaws may be similar to or different from those described above, provided the jaws centralize and clamp the fiber along the predefined clamping axis. In another illustrative embodiment shown in FIG. 11, each clamp jaw 504 includes a pair of angled clamp surfaces 510, 512 that provide a centralizing zone midway between the ends of the jaw. Similar to the jaws described above, the angled clamp surfaces form a generally V-shaped notch configured cooperate with the corresponding notch of the opposed jaw to capture and position the fiber coaxial with the clamping axis. Again, it is to be appreciated that other jaw configurations may be employed to center and grip the fiber.

Figure 12:
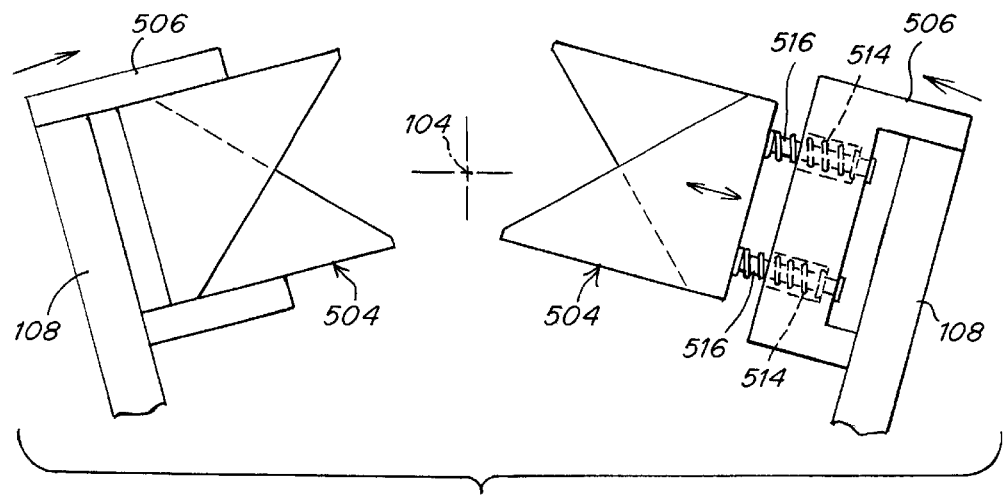
FIG. 12 is a schematic view illustrating one embodiment of the mounting arrangement for the clamp jaws of the centralizing clamp of FIG. 9.

In some applications, it may be desirable to capture and centralize the fiber before it becomes sealed between the seal members to ensure that the fiber is accurately positioned coaxial with the clamping axis as the clamp is actuated to the closed position. In one illustrative embodiment shown in FIG. 12, one of the clamp jaws is fixed to the clamp arm, while the opposing clamp jaw is movably supported on its clamp arm so as to move in a reciprocating radial direction relative to the clamping axis. At least one biasing element, such as a compression spring 514, may be disposed between the movable jaw 504 and its clamp arm 108 to bias the jaw inwardly toward the clamping axis 104 and opposing jaw 504 so that the jaws engage a fiber prior to the seal members as the clamp arms rotate toward the closed position. As illustrated, the movable jaw may be slidably connected to the clamp arm 108 with a pair of slide pins 516. A pair of compression springs 514 may be supported about the pins 516 to bias the jaw outwardly. It is to be understood, however, that any suitable mounting arrangement may be implemented for movably mounting at least one of the jaws, if desired and that the invention is not limited to the illustrative arrangements.

In this embodiment, as the clamp arms 108 close toward each other, the fiber is first captured and loosely positioned within the clamp jaws 504 prior to the clamp being fully closed. As the clamp arms 108 continue to close, the clamp jaws 504 centralize and lightly clamp the fiber. Additional force generated by the actuator causes the springs 514 in the spring-loaded jaw to compress, thereby more tightly clamping the fiber until the clamp jaws are fully closed about the fiber at which time the seal members 502 engage each other to seal the fiber.

Having thus described various illustrative embodiments, and aspects thereof, variations and modifications may be apparent to those skilled in the art. Such variations and modifications are intended to be covered by this disclosure. The foregoing discussion is therefore for purposes of illustration only, and the scope of the invention should be determined by proper construction of the appended claims, and their equivalents.

What is claimed is:

1. A centralizing clamp for positioning each of a plurality of optical fibers along a predefined clamping axis, each of the plurality of optical fibers having an outer diameter that differs from an outer diameter of others of the plurality of optical fibers, the centralizing clamp comprising:
    a base; and
    first and second clamp jaws movably supported by the base relative to the predefined clamping axis between an open position and a closed position to hold any one of the plurality of optical fibers therebetween, the first and second clamp jaws being constructed and arranged to position each one of the plurality of optical fibers coaxial with the predefined clamping axis when moved toward the closed position, each of the first and second clamp jaws including at least first and second clamping surfaces, the first clamping surface being angled with respect to the second clamping surface;
    wherein the first and second clamping surfaces are constructed and arranged to exert a radial compressive force on the optical fiber, when in the closed position, substantially without exerting any shear forces on the optical fiber.

2. The centralizing clamp according to claim 1, wherein the first and second jaws are constructed and arranged to nest together when moved toward the closed position to form an optical fiber receptacle that is adapted to receive each of the plurality of optical fibers therein, the optical fiber receptacle having a variable size.

3. The centralizing clamp according to claim 2, further comprising a sensor supported adjacent at least one of the first and second clamp jaws, the sensor being adapted to detect a presence of an optical fiber within the optical fiber receptacle.

4. The centralizing clamp according to claim 1, wherein the first and second clamping surfaces form a substantially V-shaped notch.

5. The centralizing clamp according to claim 1, wherein the first clamping surface is oriented perpendicular to the second clamping surface.

6. The centralizing clamp according to claim 5, further comprising a sensor supported proximate to at least one of the first and second clamp jaws, the sensor being adapted to sense a presence of the optical fiber between the clamp jaws.

7. The centralizing clamp according to claim 1, further comprising an actuator coupled to the first and second clamp jaws, the actuator being constructed and arranged to move the first and second clamp jaws between the open and closed positions in response to an actuation signal.

8. The centralizing clamp according to claim 1, further comprising at least one sensor adapted to detect the clamp jaws being in at least one of the open position and the closed position.

9. The centralizing clamp according to claim 1, wherein the first and second clamp jaws are constructed and arranged to receive the optical fiber from a radial direction when in the open position.

10. A centralizing clamp for positioning a length of optical fiber along a predefined clamping axis, the optical fiber having an optical fiber axis and an outer diameter, the centralizing clamp comprising:
    a base; and
    first and second clamp jaws movably supported by the base relative to the predefined clamping axis between an open position and a closed position to hold the optical fiber therebetween, the jaws being constructed and arranged to capture the optical fiber with the optical fiber axis initially located within a region of uncertainty about the clamping axis and position the optical fiber coaxial with the clamping axis as the first and second jaws are moved toward the closed position, the region of uncertainty having a diameter that is greater than the outer diameter of the optical fiber;
    wherein the first and second clamping jaws are constructed and arranged to exert a radial compressive force on the optical fiber, when in the closed position, substantially without exerting any shear forces on the optical fiber.

11. The centralizing clamp according to claim 10, wherein each of the first and second clamp jaws comprises at least first and second clamping surfaces, the first clamping surface being angled with respect to the second clamping surface.

12. The centralizing clamp according to claim 11, the at least first and second clamping surfaces are constructed and arranged so as to intersect along the predefined clamping axis in the closed position.

13. The centralizing clamp according to claim 11, wherein the first and second clamping surfaces form a substantially V-shaped notch.

14. The centralizing clamp according to claim 13, wherein the substantially V-shaped notches are constructed and arranged to nest together when the first and second jaws are moved toward the closed position and form an optical fiber receptacle about the predefined clamping axis.

15. The centralizing clamp according to claim 11, wherein the first clamping surface is oriented perpendicular to the second clamping surface.

16. The centralizing clamp according to claim 10, wherein the first and second clamp jaws are constructed and arranged to nest together when moved toward the closed position to form a optical fiber receptacle that is adapted to receive the optical fiber therein, the optical fiber receptacle having a variable size.

17. The centralizing clamp according to claim 16, further comprising a sensor supported proximate to at least one of the first and second clamp jaws, the sensor being adapted to sense a presence of the optical fiber within the optical fiber receptacle.

18. The centralizing clamp according to claim 10, further comprising an actuator that actuates the first and second clamp jaws between the open and closed positions in response to an actuation signal.

19. The centralizing clamp according to claim 10, wherein the clamp jaws are rotatably supported by the base to rotate between the open and closed positions.

20. The centralizing clamp according to claim 10, further comprising a sensor adapted to detect the clamp jaws being in at least one of the open position and the closed position.

21. The centralizing clamp according to claim 10, wherein the first and second clamp jaws are constructed and arranged to exert a predetermined clamping force on the fiber.

22. The centralizing clamp according to claim 21, wherein the clamping force is adjustable.

23. A centralizing clamp for positioning a length of fiber along a predefined clamping axis, the centralizing clamp comprising:
   a base; and
   first and second pairs of opposing clamp surfaces movably supported by the base between open and closed positions relative to the predefined clamping axis, the first and second pairs of opposing clamp surfaces being movable toward first and second planes, respectively, as the first and second pairs of opposing clamp surfaces move toward the closed position to form a fiber receptacle that is configured to position the fiber coaxial with the predefined clamping axis, the first plane intersecting the second plane along the predefined clamping axis, and at least one of the first and second pairs of opposing clamp surfaces being engageable with each other along one of the first and second planes, respectively, in the closed position.

24. The centralizing clamp according to claim 23, wherein the fiber receptacle is configured to position a fiber having any one of a range of diameters along the predefined clamping axis.

25. The centralizing clamp according to claim 24, wherein the first and second pairs of opposing clamp surfaces form a radial opening to receive the fiber when in the open position.

26. The centralizing clamp according to claim 23, wherein the first and second pairs of opposing clamp surfaces are constructed and arranged to locate the fiber located anywhere within a region of uncertainty about the clamping axis and position the fiber coaxial with the clamping axis in the closed position.

27. The centralizing clamp according to claim 23, further comprising an actuator coupled to the first and second pairs of opposing clamp surfaces, the actuator being constructed and arranged to actuate the first and second pairs of opposing surfaces between the open and closed positions in response to an actuation signal.

28. The centralizing clamp according to claim 22, further comprising a sensor adapted to sense a presence of the fiber between the first and second pairs of opposing clamp surfaces.

29. The centralizing clamp according to claim 23, further comprising sensor adapted to detect at least one of the first and second pairs of opposing clamp surfaces being in at least one of the open position and the closed position.

30. A centralizing clamp for positioning a length of fiber along a predefined clamping axis, the centralizing clamp comprising:
   a base;
   first and second clamp jaws movably supported by the base relative to the predefined clamping axis between an open position and a closed position, the first and second jaws being constructed and arranged to form a fiber receptacle as the first and second clamp jaws are moved toward the closed position, the fiber receptacle being configured to position the fiber coaxial with the predefined clamping axis; and
   a sensor supported adjacent at least one of the first and second clamp jaws, the sensor being adapted to detect a presence of the fiber within the fiber receptacle.

31. The centralizing clamp according to claim 30, wherein the sensor comprises an optical sensor.

32. The centralizing clamp according to claim 30, wherein the first and second clamp jaws are constructed and arranged to position a fiber having any one of a range of diameters coaxial with the predefined clamping axis.

33. The centralizing clamp according to claim 30, wherein the first and second clamp jaws are constructed and arranged to capture the fiber initially located within a region of uncertainty about the clamping axis and to position the fiber coaxial with the clamping axis in the closed position, the region of uncertainty having a diameter that is greater than an outer diameter of the fiber.

34. The centralizing clamp according to claim 30, wherein each of the first and second clamp jaws comprises at least first and second clamping surfaces, the first and second clamping surfaces being constructed and arranged to exert a radial compressive force on the fiber when in the closed position, without exerting a substantial shear force on the fiber.

35. The centralizing clamp according to claim 34, wherein the first clamping surface is angled with respect to the second clamping surface.

36. The centralizing clamp according to claim 35, wherein the first and second clamping surfaces are constructed and arranged so as to intersect along the clamping axis when in the closed position.

37. The centralizing clamp according to claim 30, further comprising an actuator coupled to the first and second clamp jaws, the actuator being constructed and arranged to actuate the first and second clamp jaws between the open and closed positions in response to an actuation signal.

38. A centralizing clamp for positioning each of a plurality of optical fibers along a predefined clamping axis, each of the plurality of optical fibers having an outer diameter that differs from an outer diameter of others of the plurality of optical fibers, the centralizing clamp comprising:
   means for capturing any one of the plurality of optical fibers initially located within a region of uncertainty about the clamping axis, the region of uncertainty having a diameter that is greater than the diameter of the optical fiber;
   means for positioning each one of the plurality of optical fibers coaxial with the clamping axis; and
   means for exerting a radial compressive force on the optical fiber, when in the closed position, substantially without exerting any shear forces on the optical fiber.

39. The centralizing clamp according to claim 38, further comprising means for applying a clamping force to the optical fiber.

40. The centralizing clamp according to claim 38, further comprising means for adjusting the clamping force.

41. A centralizing clamp for positioning a length of optical fiber, having an outer diameter, along a predefined clamping axis, the centralizing clamp comprising:
   means for capturing the optical fiber initially located within a region of uncertainty about the clamping axis, the region of uncertainty having a diameter that is greater than the diameter of the optical fiber;
   means for positioning the optical fiber coaxial with the clamping axis;

means for exerting a radial compressive force on the optical fiber, when in the closed position, substantially without exerting any shear forces on the optical fiber; and means for actuating the means for capturing between open and closed positions in response to an actuation signal.

* * * * *